United States Patent
Cherkauer et al.

(10) Patent No.: US 7,962,638 B2
(45) Date of Patent: Jun. 14, 2011

(54) DATA STREAM FILTERS AND PLUG-INS FOR STORAGE MANAGERS

(75) Inventors: Kevin J. Cherkauer, Portland, OR (US); Jonathan Leffler, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 11/690,943

(22) Filed: Mar. 26, 2007

(65) Prior Publication Data

US 2008/0243979 A1    Oct. 2, 2008

(51) Int. Cl.
G06F 15/16    (2006.01)
G06F 15/173    (2006.01)
G06F 15/177    (2006.01)

(52) U.S. Cl. ......... 709/231; 713/165; 713/193; 708/303

(58) Field of Classification Search .......... 709/217–232; 708/303; 713/165, 193
See application file for complete search history.

(56) References Cited

U.S. PATENT DOCUMENTS

| | | | |
|---|---|---|---|
| 6,418,478 B1 | 7/2002 | Ignatius et al. | |
| 6,735,310 B1 | 5/2004 | Hsing et al. | |
| 7,493,349 B2 * | 2/2009 | Nguyen et al. | 707/204 |
| 2004/0049598 A1 | 3/2004 | Tucker et al. | |
| 2005/0172143 A1 | 8/2005 | Fearnley | |
| 2006/0089967 A1 | 4/2006 | Gutmans et al. | |
| 2006/0123035 A1 | 6/2006 | Ivie | |
| 2006/0212698 A1 | 9/2006 | Peckover | |
| 2007/0288534 A1 * | 12/2007 | Zak et al. | 707/204 |
| 2008/0065882 A1 * | 3/2008 | Goodman et al. | 713/165 |
| 2008/0065898 A1 * | 3/2008 | Greco et al. | 713/185 |
| 2008/0082835 A1 * | 4/2008 | Asher et al. | 713/193 |

FOREIGN PATENT DOCUMENTS

| | | |
|---|---|---|
| JP | 2006106992 | 4/2004 |
| WO | WO2004017184 | 2/2004 |
| WO | WO2006053050 | 5/2006 |

OTHER PUBLICATIONS

PCT International Search Report and Written Opinion of the International Searching Authority, PCT/EP2008/053144, Jun. 4, 2008, 12 pages.

(Continued)

*Primary Examiner* — Haresh N Patel
(74) *Attorney, Agent, or Firm* — Walter W. Duft (57) ABSTRACT

A storage manager and related method and computer program product manages client data on a data storage resource and includes the ability to utilize many different types of data stream filters that are neither built into the storage manager nor require a custom programming effort. A storage manager user may readily implement filtering by simply identifying a data stream filter the user wishes the storage manager to use for filtering the user's data. The filter can be an off-the-shelf program that is not part of the storage manager and which does not require client application or storage manager domain knowledge (e.g., knowledge of protocols or data types or formats used by the application or storage manager). The storage manager invokes the identified filter as part of a requested data stream operation and receives a data stream from a data stream source. The data stream is provided to the filter, which filters the data stream. Following filtering, the storage manager receives the data stream from the filter and sends it to a data stream destination.

14 Claims, 9 Drawing Sheets

OTHER PUBLICATIONS

IBM Informix Storage Manager—Administrator's Guide—V2.2, XP002481063 [Online <http://www.informix.com.ua/doc/9.40/ct1swna.pdf>] Mar. 1, 2003, 27 pages.

P. Conway et al., "The reduction of image ambiguity for process control using product knowledge," Factory 2001—Integrating Information and Material Flow, 1990, Second International Conference on Cambridge, UK, London, UK, IEE, UK, XP006512371, Jan. 1, 1990 (pp. 139-143).

B. Ku et al., "SRSGEN—a software reuse tool for large scale operations," Software Reusability, 1993, Proceedings Advances in Software Reuse, Selected Papers from the Second International Workshop on Lucca, Italy, Mar. 24-26, 1993, Los Alamitos, CA, USA, IEEE Comput. Soc., US, Mar. 24, 1993, XP010094656, pp. 109-115.

P. Oreizy et al., "On the role of software architectures in runtime system reconfiguration," IEE Proceedings: Software, IEE, Stevenage, GB, vol. 145, No. 5, Oct. 26, 1998, pp. 137-145.

C. Ballard et al., "Informix Dynamic Server V10 . . . Extended Functionality for Modern Business," IBM Redbooks, [Online <http://www.ukm.my/pk/ITTalk/IDSv10_SG24_7299_00.pdf>, Dec. 1, 2006, 422 pages.

\* cited by examiner

DATA STREAM FILTERS AND PLUG-INS FOR STORAGE MANAGERS

BACKGROUND OF THE INVENTION

1. Field of the Invention

The present invention relates to storage managers that provide data storage services to software applications. More particularly, the invention concerns the provision of filtering functions such as encryption, compression and other data conversions as part of storage manager operations.

2. Description of the Prior Art

By way of background, a storage manager is a system that acts as an intermediary between a software application (such as a backup/restore program or a web server) and a data storage resource (such as a tape drive, a disk drive, a storage subsystem, etc.). The storage manager, which could be integrated with the application program or implemented separately therefrom, provides an interface that accepts objects for storage and subsequently retrieves the objects upon request. Applications for which a storage manager has been used include the management of backup images of database installations, enterprise application data, individual workstations, web content, etc.

There is often a need for a storage manager to filter the data being written to or read from physical storage devices by compressing or encrypting the data. Existing storage managers that provide support for compression and/or encryption do so in one of two ways. Most commonly, such filtering is provided by algorithms that are embedded in the storage manager product itself. Less commonly, such filtering is supported by providing a programming hook that gives a storage manager user the option of writing their own algorithm(s). With this option, the user is also required to re-implement much of the functionality of the storage manager on their own.

Drawbacks of the First Approach Include:

The user is limited to the compression and/or encryption algorithms that are built into the storage manager product.

Some products support encryption but not compression and vice versa.

Some products support only weak encryption or poor compression.

The storage manager vendor may charge customers extra to enable the compression and/or encryption algorithms that are built in.

If a built-in algorithm is found to have a security flaw or a crippling bug, a customer cannot immediately swap in a different off-the-shelf algorithm to avoid exposure to the risk.

Storage manager customers must wait for the vendor to update the embedded algorithms with the latest technology when better algorithms are invented, even though the new technology may already exist in stand-alone off-the-shelf programs.

A vendor may not implement a particular compression or encryption algorithm that a customer desires.

Drawbacks of the Second Approach Include:

The storage manager programming hook places a burden on the customer to re-implement much of the functionality the storage manager otherwise provides. The user must typically write a program that can accept objects for storage, track the location of these objects, write and read them to/from physical storage devices, and retrieve them upon request based on whatever query protocol the storage manager requires, as well as write in the desired compression and/or encryption algorithms. In this solution, the storage manager essentially delegates all work to the user and does not provide any functionality of its own. The storage manager mostly acts as a hollow shell or "stub" that forwards all storage and retrieval requests to the user-written external program for handling. The storage manager itself merely assembles and disassembles buffers of information that pass between it and the application that is calling it, and provides stubs for the interface APIs (Application Programming Interfaces) but delegates most of the work to the user's program.

This approach provides very little support for compression and encryption. There is the programming hook but the customers are required to create the needed support at great additional expense and effort to themselves.

A customer who uses the programming hook but does not sufficiently test and debug their external program may find that their data has been corrupted by their own custom program, or that bugs in the program prevent the retrieval of storage objects at a critical time, such as when they need them to restore a down system.

If the event described in the preceding paragraph occurs, the storage manager vendor may find itself exposed to liability for the customer's own programming mistakes.

Accordingly, a need exists for a storage manager filtering technique that overcomes the foregoing disadvantages. What is required is a solution that allows storage manager filters to be easily implemented without having to redesign the storage manager or duplicate its functionality in a custom program. It would be further desirable to provide the capability of implementing new and different filters. At present, the most common needs for storage manager filtering are compression and encryption. However, it is submitted that the possibilities are broader, and it may be advantageous in some circumstances to provide other data conversions, such as converting between English and metric units, or between different code pages or character sets like ASCII (American Standard Code for Information Interchange), EBCDIC (Extended Binary Coded Decimal Interchange Code), and Unicode. By way of example, this capability would be useful if backup data was generated by a first system in a first character format (e.g., a mainframe computer using EBCDIC character) and the data needed to be restored to a second system that used a second character format (e.g., a workstation using ASCII character encoding). Another area where storage manager filtering could be used is the generation of audit trails. Such a filter could be used to inspect the data being stored or retrieved and generate audit information for management purposes.

SUMMARY OF THE INVENTION

The foregoing problems are solved and an advance in the art is obtained by a method, system and computer program product in which a storage manager that manages client data on a data storage resource has the ability to utilize many different types of data stream filters that are neither built into the storage manager nor require a custom programming effort. A storage manager user may readily implement filtering by simply identifying a data stream filter the user wishes the storage manager to use for filtering the user's data. The filter can be an off-the-shelf program that is not part of the storage manager and which does not require client application or storage manager domain knowledge (e.g., knowledge of protocols or data types used by the client application or the storage manager). The storage manager invokes the identified filter as part of a requested data stream operation and receives a data stream from a data stream source. The data stream is provided to the filter, which filters the data stream. Following filtering, the storage manager receives the data stream from the filter and sends it to a data stream destination.

According to exemplary embodiments disclosed herein, the filter identification may be received as one of an attribute of a storage manager transaction request, a storage resource, an application, a host, a user, a storage object category, etc. The filtering may or may not result in a transformation of the data stream. If the filter does transform the data stream, it may be implemented as part of a filter pair comprising a write filter that performs a transformation on the data stream and a read filter that may or may not reverse the transformation. Such transformation may include compression/decompression filtering, encryption/decryption filtering, character set conversion filtering, etc. If the filter does not transform the data stream, it may instead be designed to generate information about the data stream, such as an audit trail.

The filter may be invoked in its own execution context and the data stream may be exchanged with the filter via an interprocess communication mechanism. This mechanism may comprise a first and second pipes, one for providing the data stream to the filter and the other for receiving the filtered data stream from the filter. The filter may be invoked with a filter argument that is passed if the filter is adapted to process the argument, or suppressed otherwise. By way of example, the filter may be an encryption or decryption filter and the filter argument may pertain to the identification of an encryption key.

In a further aspect, the storage manager is adapted to manage client data on a data storage resource with data stream filtering as a service on behalf of a remote client. In order to implement filtering, the storage manager receives either a copy of a client-selected filter or an identification of such a filter from the remote client or a location specified by the remote client, such as a trusted authority.

In a still further aspect, a storage manager is adapted to a utilize plug-in that is not necessarily a data stream filter. Such a plug-in may be a custom program that has domain knowledge of the client application data format or the storage manager, such that it is not a true data stream filter.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Figure 1:
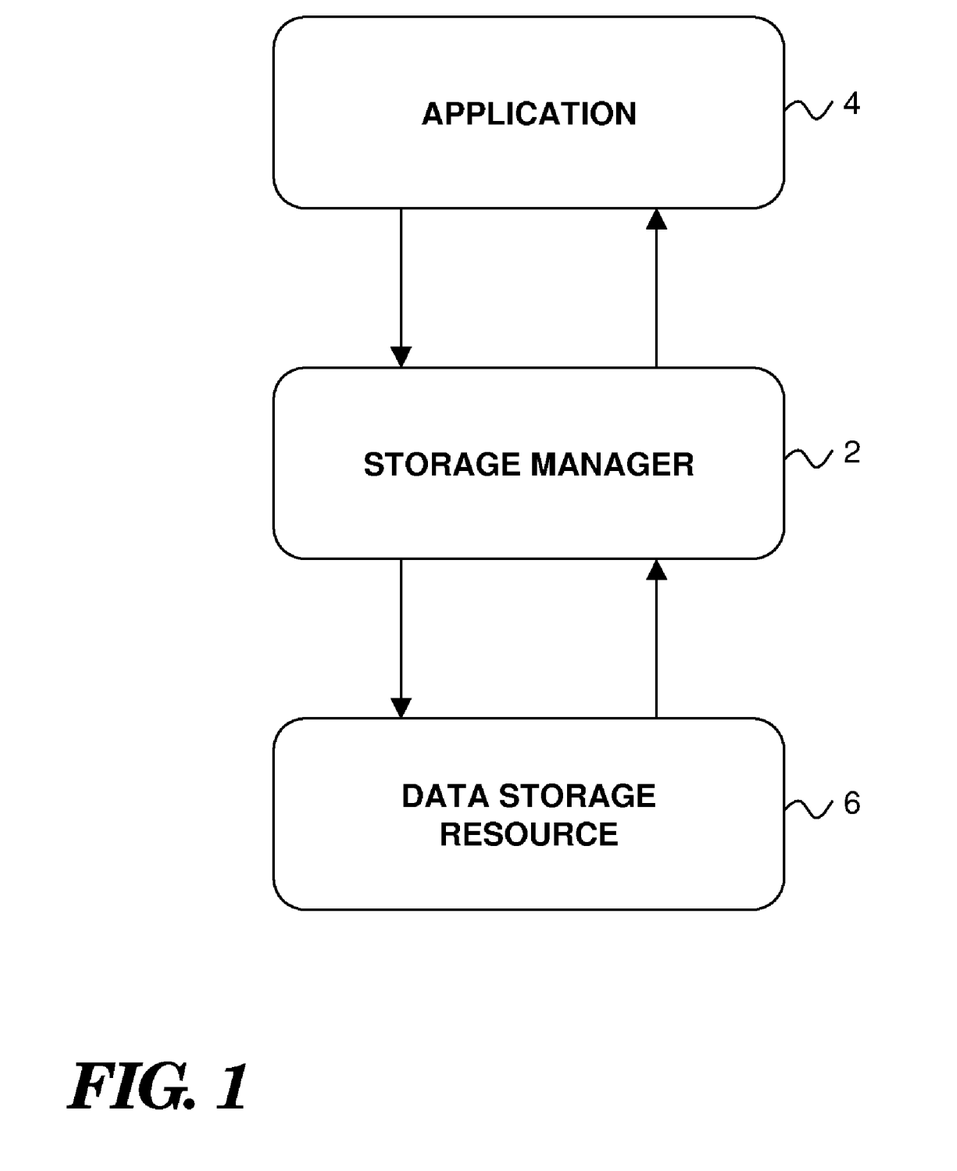
FIG. 1 is a functional block diagram showing an exemplary storage manager, a client application and a data storage resource.

Turning now to drawing figures, wherein like reference numerals indicate like elements in all of the several views, FIG. 1 illustrates a storage manager 2 that stores and retrieves data generated by a client application 4. In the data storage mode, the storage manager 2 receives a stream of data objects (data stream) from the application 4 and stores the objects in a data storage resource 6, typically (but not necessarily) for archival purposes. In the data retrieval mode, the storage manager 2 retrieves previously stored objects from the data storage resource 6 and returns them to the application 4. The storage manager logic may be implemented in software, firmware, hardware, or any combination thereof. The application 4 may represent any software application that desires to have its data placed in the data storage resource 6. The data storage resource 6 may be implemented as any physical storage device or system, including one or more tape drives, disk drives, storage subsystems, etc.

Figure 2:
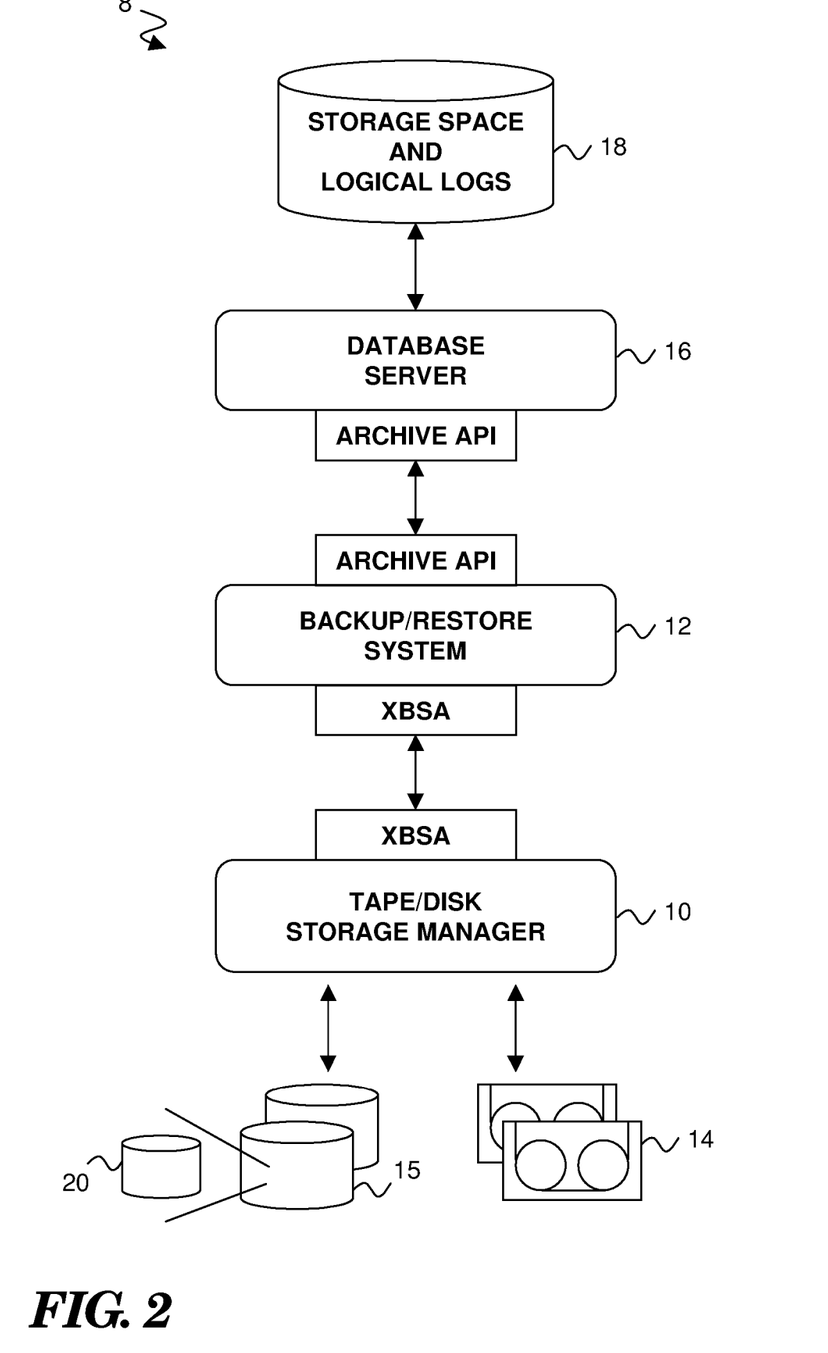
FIG. 2 is a functional block diagram showing one possible implementation of the components shown in FIG. 1.

Turning now to FIG. 2, and without limiting the scope of the present disclosure, a database system 8 represents one possible environment in which the components of FIG. 1 could be adapted for use. In the system 8, the storage manager 2 is exemplified by a tape and disk storage manager 10, the application 4 is exemplified by a database backup/restore system 12, and the data storage resource 6 is exemplified by a set of tape storage volumes 14 operable in a tape drive system (not shown) and disk storage volumes 15. The backup/restore system 12 provides data backup and restore services on behalf of a database server 16 whose storage space and logical logs 18 need to be periodically backed up and restored. By way of example only, the backup/restore system 12 could be implemented in the environment of FIG. 2 using a product such as the IBM® Informix® ON-Bar Backup and Restore System. This product provides tape and disk backup and restore services to database servers, such as the IBM® Informix® Dynamic Server (IDS), which may be used to implement the database server 16. The database server 16 may communicate backup and restore requests to the backup/restore system 12 via an Archive API (Application Programming Interface) that is part of the Informix® product. In response to these requests, the backup/restore system 12 would invoke the storage manager 10 to implement storage and retrieval operations via a protocol such as XBSA (X/Open Backup Services API). The storage manager 10 may be implemented (with appropriate modifications to support filtering as described herein) using a product such as the IBM® Informix® Storage Manager (ISM). The storage manager 10 manages the tape storage volumes 14 and disk storage volumes 15. The storage manager 10 also maintains inside the disk storage volumes 15 a catalog 20 of backup and restore operations that correlates stored data objects with the corresponding tape storage volumes 14 and disk storage volumes 15. Among the functions of the storage manager 10 are writing and reading data on the actual tapes and disks, keeping track of what data is on which tape or disk, and assigning the data to categories.

A data backup operation may be initiated by an administrator of the database server 16 issuing a backup request to the backup/restore system 12. The backup/restore system 12 determines what data needs to be backed up and connects to the storage manager 10. The backup/restore system 12 then retrieves the appropriate data from the storage space and logical logs 18, builds a list of backup objects, and passes it to the storage manager 10. The storage manager 10 creates a save set from the data object list and writes the save set (comprising one or more data objects) to the proper tape storage volumes 14 and/or disk storage volumes 15. The storage manager 10 then enters a record of the save sets and the storage volumes in the catalog 20. The storage manager 10 uses the catalog 20 to track the save sets and the volumes on which they are backed up.

A data restore operation may be initiated by an administrator of the database server 16 issuing a restore request to the backup/restore system 12. The backup/restore system 12 determines what data needs to be restored and connects to the storage manager 10. The storage manager 10 searches the catalog 20 for the specific restore objects requested by the backup/restore system 12 and maps each restore object to its offset in the save set. The backup/restore system 12 then retrieves the data from the storage manager and passes it to the database server 16, object by object. The database server 16 writes the data to the proper location(s) in the storage space and logical logs 18.

As described by way of background above, it is sometimes desirable for a storage manager to filter data being stored in or retrieved from a data storage resource. Conventional storage managers offer limited filtering options, such as compression/decompression and encryption/decryption. As also mentioned, such filters are either embedded in the storage manager logic, and are thus difficult to modify or update, or a complex programming effort is required to create and implement such filters using a programming hook. The storage manager 2 improves upon this situation by providing a mechanism whereby a user can easily and straightforwardly plug in off-the-shelf compression, encryption, or other data conversion programs that can be applied to data being written to or read from the data storage resource 6.

Figure 3:
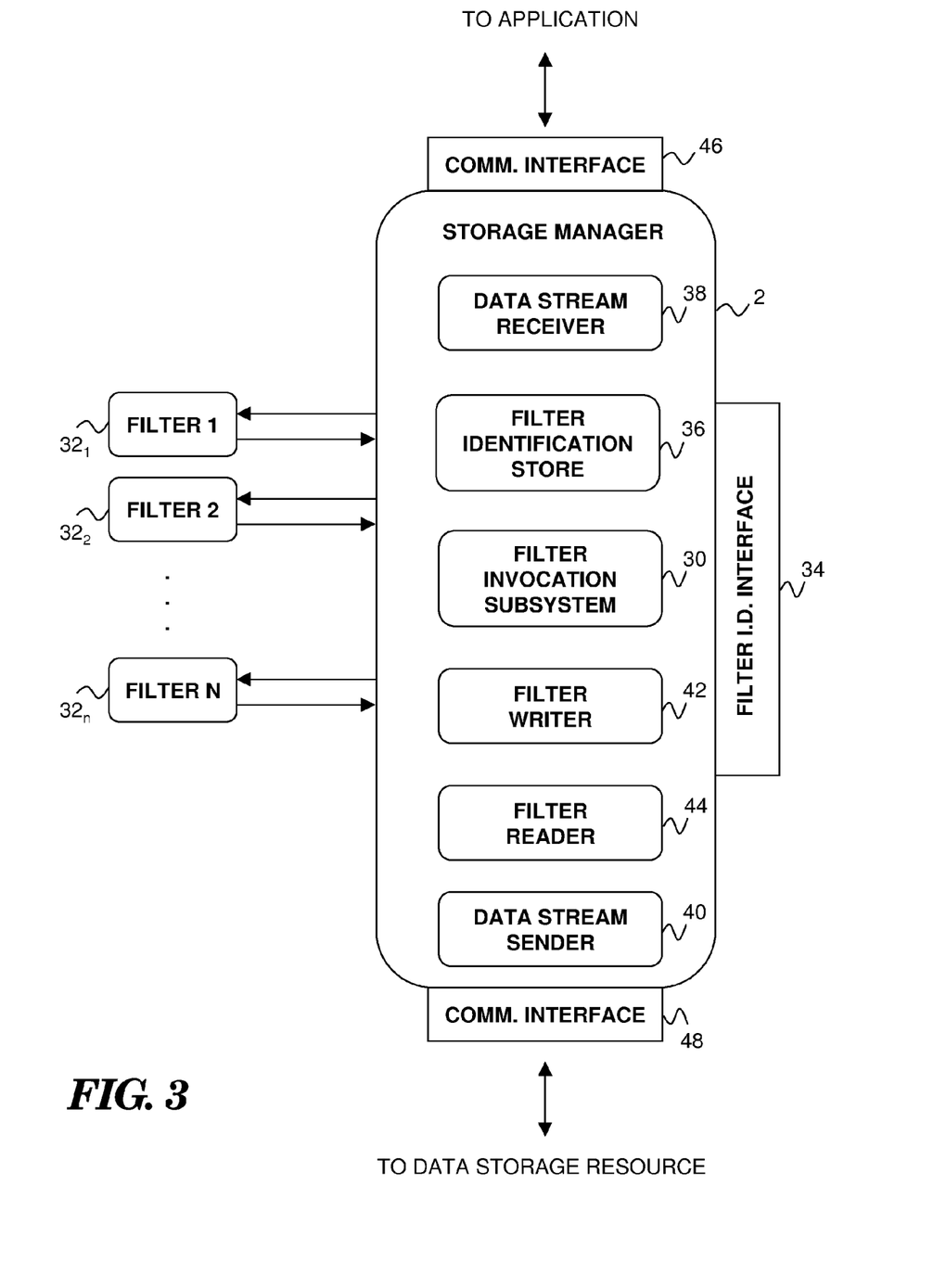
FIG. 3 is a functional block diagram showing exemplary details of the storage manager of FIG. 1.

FIG. 3 illustrates an exemplary implementation of the storage manager 2 that may be used to implement this functionality. As shown, the storage manager 2 implements a filter invocation subsystem 30 that is responsible for invoking a filter 32 that may be specified from a group of filters $32_1$, $32_2$ ... $32_n$. These filters are not part of the storage manager 2. Instead, they are standalone programs (or libraries) residing in a data processing system that will typically also implement the storage manager (albeit in a separate execution context). Alternatively, the storage manager 2 and the filter 32 could execute on separate systems. A filter identification interface 34 allows a user to specify a filter 32 to be used as part of a requested data stream operation. The interface 34 may be implemented to support local or remote access to the storage manager 2, such as via a command line or graphical user interface operated by a user or administrator of the storage manager. A filter identification store 36, such as a storage file, a memory, etc., may be used to retain the filter identification in the storage manager 2. As described in more detail below, this supports the ability to identify a filter 32 as an object attribute, such as an attribute of the storage resource 6 (see FIG. 1), an application, a host, a user, or a data object category. Because other attributes for such objects are conventionally maintained by the storage manager 2 (e.g., data resource attributes) the addition of a filter attribute may be readily implemented. In this way, different filters 32 can be associated with different storage resources 6 (see FIG. 1), applications, hosts, users or storage object categories. Without this capability, a user or application would have to identify a filter as a parameter of each data stream command.

The data storage manager 2 further includes a data stream receiver 38 and a data stream sender 40, as well as a filter writer 42 and a filter reader 44. A first conventional communication interface 46 is also provided for communicating with the application 4 (see FIG. 1) (e.g., implementing the XBSA protocol) and a second conventional communication interface 48 is provided for communicating with the data storage resource 6 (see FIG. 1) (e.g., implementing a storage device-specific protocol).

Figure 4:
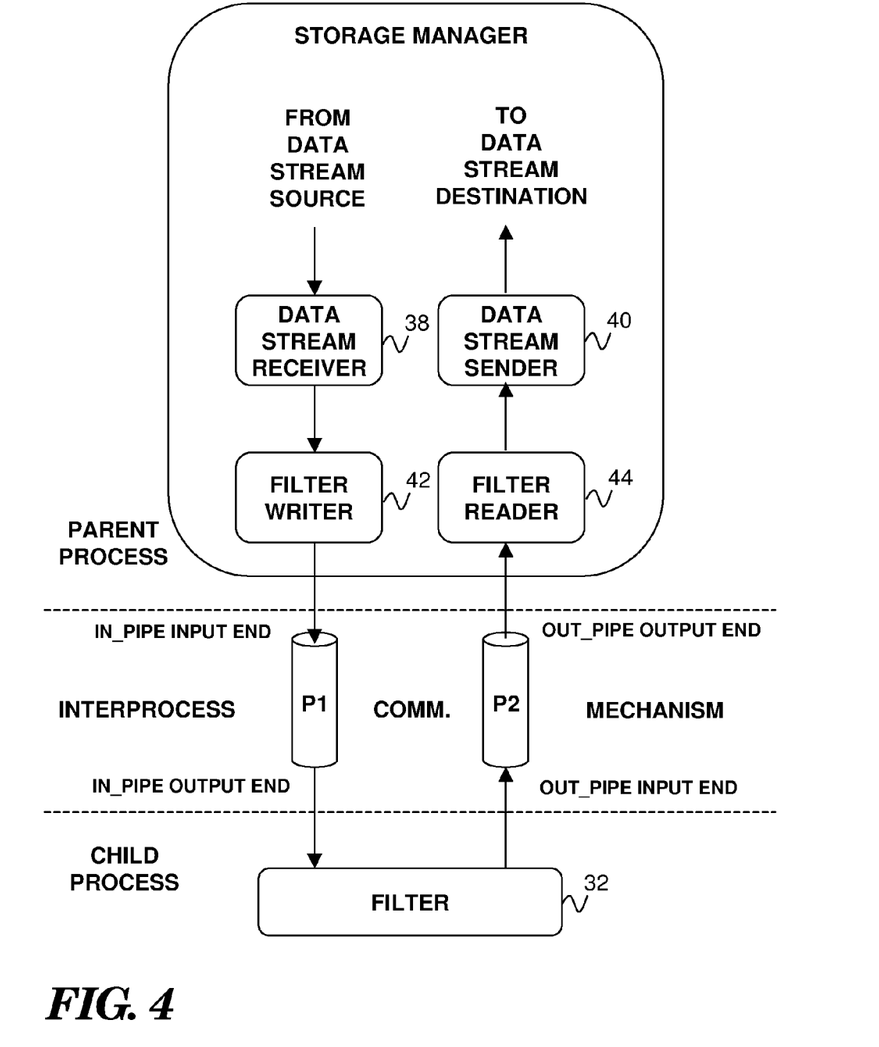
FIG. 4 is a functional block diagram shown an exemplary mechanism for interprocess communication between the storage manager of FIG. 3 and a filter.
Figure 5:
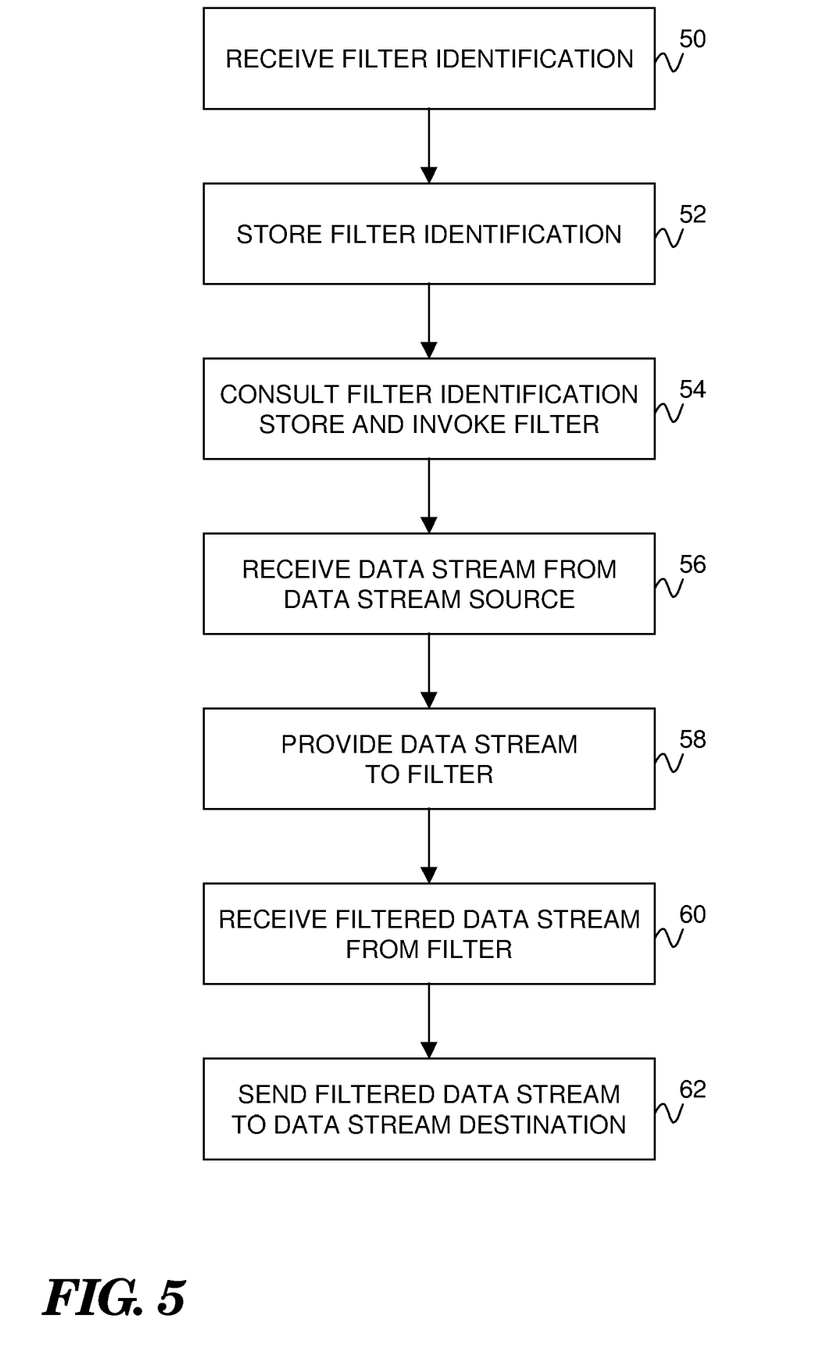
FIG. 5 is a flow diagram showing exemplary steps that may be implemented by the storage manager of FIG. 1 to perform data stream filtering.

The arrangement of the data stream receiver 38, the data stream sender 40, the filter writer 42 and the filter reader 44 is shown in FIG. 4, as is the relationship between the data stream writer and the data stream reader relative to a filter 32. The operation of the storage manager 2, including the actions of the foregoing components, will now be described with additional reference to the flow diagram of FIG. 5. As shown in step 50 of FIG. 5, the ability of the storage manager 2 to utilize the filter 32 begins with a user identifying the filter to the storage manager via the filter identification interface 34. In step 52 of FIG. 5, the storage manager 2 stores the filter identification in the filter identification store 36. Either subsequent to or contemporaneously with the filter identification, the storage manager 2 will be requested to perform a data stream operation, such as a backup or restore. In step 54 of FIG. 5, the filter invocation subsystem 30 consults the filter identification store 36 and then invokes the filter 32 identified therein. In step 56 of FIG. 5, the data stream receiver 38 receives a data stream from a data stream source. For some operations (e.g., data backup) the data stream source will be the application 4 (see FIG. 1). For other operations (e.g., data restore) the data stream source will be the data storage resource 6 (see FIG. 1). In step 58 of FIG. 5, the data stream receiver 38 passes the incoming data stream to the filter writer 42. The function of the filter writer 42 is to provide the data stream to the identified filter 32 for filtering. Because the filter 32 runs in a separate execution context (or on a separate system) the filter writer 42 will use an appropriate inter-process communication (IPC) mechanism, such as a pair of pipes P1 and P2 (see FIG. 4), to communicate with the filter. Other IPC mechanisms, such as sockets (e.g., if the filter 32 runs on a separate data processing system), could also be used. In step 60 of FIG. 5, the filter reader 44 receives the filtered data stream back from the filter 32 that performed the filtering. It passes the filtered data stream to the data stream sender 40 in step 62 of FIG. 5, which sends the data stream to a data stream destination. For some operations (e.g., data backup) the data stream destination will be the data storage resource 6 (see FIG. 1). For other operations (e.g., data restore) the data stream destination will be the application 4 (see FIG. 1).

In many cases, the filter program that comprises the filter 32 will not require any awareness of the protocols or data types used by the storage manager 2 or the application 4 (hereinafter referred to as "domain knowledge"), but need only read from stdin (standard input) and write to stdout (standard output). Such programs are true "filters" that are capable of processing raw data streams according to the standard definition of "filter" that has been well-known since the advent of the Unix operating system. The Unix "compress"

and "uncompress" programs are just two of many examples of off-the-shelf programs that support this type of operation. Users may also specify a filter 32 that implements other desired data transformations, such as encryption and decryption or conversion between different character sets or code pages, conversion between English units and metric, etc. A non-data transforming filter 32 could also be specified, such as a filter 32 that performs a task such as auditing. For example, such a filter could copy part of a user's data and the current username to a separate log that enables later identification of the users and the data they have accessed. Alternatively, such a filter could inspect a data stream being processed by the storage manager 2 and create log information about the transaction. Although many filter programs will be off-the-shelf software, custom filter programs may also be created. Such filter programs may be true data stream filters in the Unix sense, or they may be more in the nature of plug-ins that require domain knowledge of the storage manager's protocols or the application's data types or formats, or can accept or require arguments other than just an input stream. For example, some filter programs may be called with arguments. One such argument would be a unique ID for an object being stored or retrieved (Object ID). The filter program could choose to ignore this argument or it could use the argument as it sees fit. This capability would be useful for encryption filters, because a customer may have a policy that requires data to be encrypted with more than one key. In such a case, the object ID can be used to select the key to encrypt (write filter) or decrypt (read filter) the object in question. For example, modulo n arithmetic could be used to select among n different keys (key_id=object_id MOD n). Note that not all encryption filter programs necessarily require such an argument for key selection. For example, an encryption filter might hard-code a single key that it always uses (but this makes securing the filter itself as important as securing encryption keys in general).

Two types of filter programs that may be used for data transformation are write filters and read filters. Write filters are applied to data that the storage manager 2 will write to the data storage resource 6. The data that a user has asked to be written is passed to the write filter as input, then the output of the write filter is written to physical storage. Read filters are applied to data that the storage manager 2 will read from the data storage resource 6. The data is read from physical storage and passed to the read filter as input, then the output of the read filter is returned to the user who requested retrieval of this data.

Figure 6:
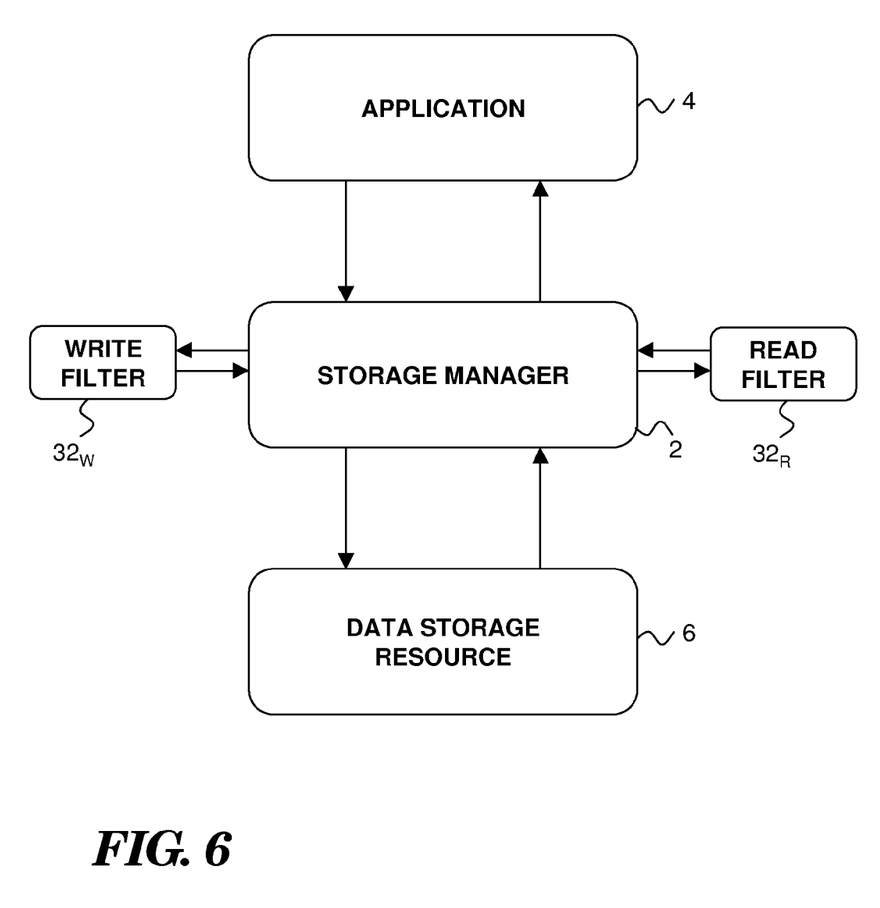
FIG. 6 is a functional block diagram showing the storage manager of FIG. 1 in combination with a pair of read and write filters.

If desired, two filters 32 may be defined as pair: a write filter that transforms data in one direction (e.g. Unix "compress"), and a read filter that reverses the original transformation (e.g. Unix "uncompress"). An example of such filter pairing is shown in FIG. 6, which illustrates a write filter $32_W$ paired with a read filter $32_R$. Note that a filter 32 which simply passes data through unchanged may also be defined. Thus, it would be possible to pair a write filter that transforms EBCDIC data to ASCII with a read filter that performs no transformations. The result would be that source data in EBCDIC would be stored in ASCII and later retrieved in ASCII rather than being converted back to EBCDIC.

As mentioned above, in one implementation of the storage manager 2 a filter 32 may be defined as an attribute of a physical storage device (e.g. representing part of the data storage resource 6). This is convenient because in many storage managers the attributes of physical storage devices must be described before they can be used to store and retrieve data. Such attributes may include (1) the path to the device, (2) whether it is a disk or tape device, and (3) the maximum number of bytes to store in the device. The storage manager 2 may implement two new device attributes; namely, a read filter and writer filter. These attributes may be specified as flags on a device definition command, such as the following:

sm -p /disk1/ids/logbu -t DISK -s 1000M\
    -Fr /usr/bin/uncompress\
    -Fw /usr/bin/compress This statement, which may be used to define a physical storage device to the storage manager 10, identifies the device and various attributes thereof, including the -Fr flag which is followed by the path to a read filter program to use for this device and the -Fw flag which is followed by the path to a write filter program. The statement begins with the identifier "sm" to signify the storage manager. The "p" flag signifies a storage device path specification. The /disk1/ids/logbu" field identifies the actual path to the storage device. The "-t DISK" attribute signifies that the device type is a disk. The "-s 1000M" attribute identifies the size of the device. By way of example only, the read filter program identified by the -Fr flag is shown to be the Unix "uncompress" program and the write filter program identified by the -Fw flag is shown to be the Unix "compress" program. Both programs are normally located in the /usr/bin directory of a Unix file system. When the storage manager 2 receives the foregoing command, it can store the device attributes in a device attribute file and/or in memory. The portion of this file or memory that holds the read and write filter attributes may represent the filter identification store 36 of FIG. 3. The filter identification store 36 may thus be consulted by the filter invocation subsystem 30 during storage manager operations to determine what filter(s) to apply to data being written to or read from a particular physical device of the data storage resource 6.

As mentioned above, filter specifications are not limited to the physical device level. They could also be specified at different granularities, such as virtual device level, application level, host level, etc. Filters 32 may also be specified for different categories of storage objects, such as log files, data files, etc. Filters 32 may likewise be specified for different users or groups, or according to any other categorization scheme. Alternatively, if desired, filters 32 could be specified as a parameter of a data store or retrieve command each time the storage manager 2 is invoked by the application 4.

If the storage manager 2 is designed to pass filter arguments, such as an "-id <object_id>" argument for determining an encryption key to an encryption/decryption filter, a technique may be needed to handle filters 32 that do support this functionality. Ideally, a filter 32 would be capable of either using or ignoring this argument. However, many off-the-shelf filters are required to read from stdin and write to stdout, and may complain that they do not recognize the argument. One way to solve this problem is to write a very small wrapper script around the off-the-shelf filter component in order to process the argument. For example, this could be done for encryption filters in order to implement key selection based on data object ID. For other off-the-shelf filter programs, such as the Unix "compress" and "uncompress" programs, one may write a wrapper that ignores arguments and simply passes data to the program. Such wrapper scripts could be made executable and defined as filters 32 to the storage manager 2 rather than defining the corresponding off-the-shelf filter programs directly to the storage manager.

In the following example, a pair of two-line wrapper scripts called myCompress (which wraps Unix compress) and myUncompress (which wraps Unix uncompress) allow the Unix commands to be used as filters 32 even they do not recognize the arguments that the storage manager 2 may pass. The wrappers simply invoke the Unix filter programs without passing on the argument:

myCompress: compress wrapper script to ignore filter arguments:
        #!/usr/bin/sh
        /usr/bin/compress
    myUncompress: uncompress wrapper script to ignore filter arguments:
        #!/usr/bin/sh
        /usr/bin/uncompress The foregoing wrappers could be used in a storage device filter configuration as follows (assuming myCompress and myUncompress are installed in /usr/local/bin):

sm -p /path/to/device -t DISK -s 5 G\
        -Fw /usr/local/bin/myCompress\
        -Fr /usr/local/bin/myUncompress Another approach for handling filter programs that do not handle filter arguments would be to define a flag that indicates to the filter invocation subsystem 30 whether any arguments should be passed to the filters. If disabled for a given filter definition, the filter invocation subsystem 30 would not pass any argument to the filter 32, thereby enabling pure off-the-shelf filters that do not recognize or need the extra argument (such as a compress-uncompress pair) to be used without any wrapper script. Following is an example:

sm -p /disk1/ids/logbu -t DISK -s 1000M\
        -Fr_noarg /usr/bin/uncompress\
        -Fw_noarg /usr/bin/compress Here, the -Fr_noarg flag indicates this is a read filter that should not be passed any arguments, and the -Fw_noarg flag indicates this is a write filter that should not be passed any arguments. The off-the-shelf Unix "compress" and "uncompress" commands are then specified without needing any wrappers. Note that the original -Fr and -Fw flags described above could still be supported to indicate that arguments should be passed to the filters.

Another approach supports passing an arbitrary string of arguments to each filter 32. Following is an example:

sm -p /disk1/ids/logbu -t DISK -s 1000M\
        -Fr /usr/bin/uncompress -Fr_arg "read_arg1 read_arg2 read_arg3"\
        -Fw /usr/bin/compress -Fw_arg "write_arg1 write_arg2"

Here, the -Fr flag indicates a read filter and the -Fr_arg flag supplies a string of arguments to be passed to the read filter whenever it is invoked. The -Fw flag indicates a write filter and the -Fw_arg flag supplies a string of arguments to be passed to the write filter whenever it is invoked.

There are various implementation mechanisms that the filter invocation subsystem 30 may use to call external filters. One such example will now be described that utilizes Unix operating system facilities for creating child processes and redirecting their input and output streams. It should be understood that this example is not intended to limit the scope of the disclosure (or the appended claims) to any particular implementation, but merely to illustrate one way that the storage manager 2 could be designed. Nor is this example intended to limit the scope of the disclosure (or the appended claims) to the Unix operating system. Other operating systems have similar facilities for making child processes or threads and redirecting their input and output streams. For example, Linux is a flavor of Unix that could also use the exemplary implementation below. With porting, the same approach could be used in a Windows operating system environment, etc.

According to the exemplary implementation, a process in a Unix version of the storage manager 2 that has data to write to physical storage can first pass it through a write filter as follows:

Create two pipes, in_pipe and out_pipe (e.g., pipes P1 and P2 in FIG. 4).
    Fork a child process to execute the child filter.
    Receive data from application 4.
    Write the data to the input end of in_pipe (P1).
    Read the filtered results from the output end of out_pipe (P2).
    Write the filtered results to data storage resource 6.

The child process executes the filter and services in_pipe and out_pipe as follows:

Close stdin and replace it with the output end of in_pipe (P1).
    Close stdout and replace it with the input end of out_pipe (P2).
    Execute (in Unix, using execvp( ) or the like) the filter command.
    Exit when end-of-file reached (end of the input stream).

In the above implementation, the parent storage manager process writes unprocessed data to the input end of in_pipe (P1), which the child filter process reads from the output end of in_pipe (because a filter always reads from stdin, which the child has redirected to be the output end of in_pipe). The child filter process writes the processed results to the input end of out_pipe (P2) (because a filter always writes to stdout, which the child has redirected to be the input end of out_pipe). Finally, the parent storage manager process retrieves the processed data from the output end of out_pipe and writes it to physical storage.

Read processing can be performed in inverse fashion. Thus, a process in a Unix version of the storage manager 2 that has to read data from physical storage can first pass it through a read filter as follows:

Create two pipes, in_pipe and out_pipe (e.g., pipes P1 and P2 in FIG. 4).
    Fork a child process to execute the child filter.
    Read data from data storage resource 6.
    Write the data to the input end of in_pipe (P1).
    Read the filtered results from the output end of out_pipe (P2).
    Pass the filtered data to application 4.

The child process executes the filter and services in_pipe and out_pipe as follows:

Close stdin and replace it with the output end of in_pipe (P1).
    Close stdout and replace it with the input end of out_pipe (P2).
    Execute (in Unix, using execvp( ) or the like) the filter command.
    Exit when end-of-file reached (end of the input stream).

In the above implementation, the parent storage manager process reads unprocessed data from physical storage and writes it to the input end of in_pipe (P1), which the child filter process reads from the output end of in_pipe (because a filter always reads from stdin, which the child has redirected to be the output end of in_pipe). The child filter process writes the processed results to the input end of out_pipe (P2) (because a filter always writes to stdout, which the child has redirected to be the input end of out_pipe). Finally, the parent storage manager process retrieves the processed data from the output end of out_pipe.

Figure 7:
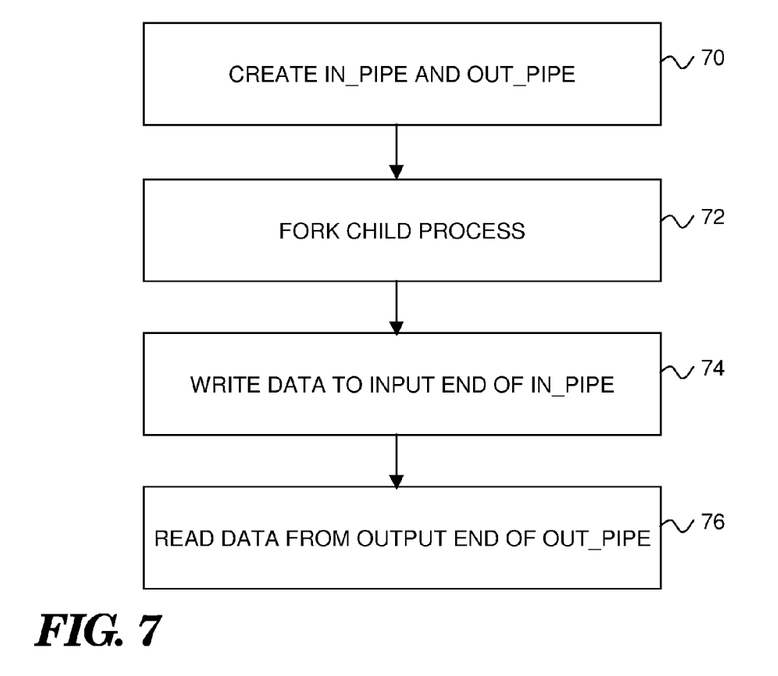
FIG. 7 is a flow diagram showing exemplary steps that may be implemented by a storage manager parent process to invoke a filter.
Figure 8:
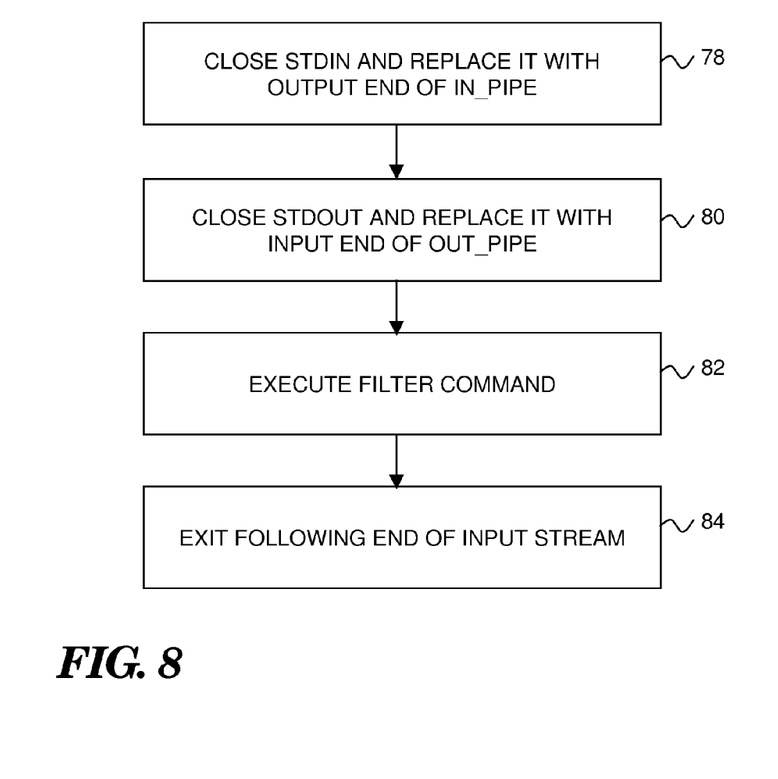
FIG. 8 is a flow diagram showing exemplary steps that may be implemented by a filter client process created by a storage manager parent process.

FIGS. 7 and 8 are flow diagrams respectively representing the operations of the storage manager parent process and the child filter process when the foregoing actions are performed.

In FIG. 7, step 70 represents the parent process creating in_pipe (P1) and out_pipe (P2). Step 72 of FIG. 7 represents the parent process forking the child process to execute the child filter. Step 74 of FIG. 7 represents the parent process writing data to the input end of in_pipe. Step 76 of FIG. 7 represents the parent process reading data from the output end of out_pipe. In FIG. 8, step 78 represents the child process closing stdin and replacing it with the output end of in_pipe (P1). Step 80 of FIG. 8 represents the child process closing stdout and replacing it with the input end of out_pipe (P2). Step 82 of FIG. 8 represents the child process executing the filter command. Step 84 of FIG. 8 represents the child process exiting when the end of the input stream is reached.

Figure 9:
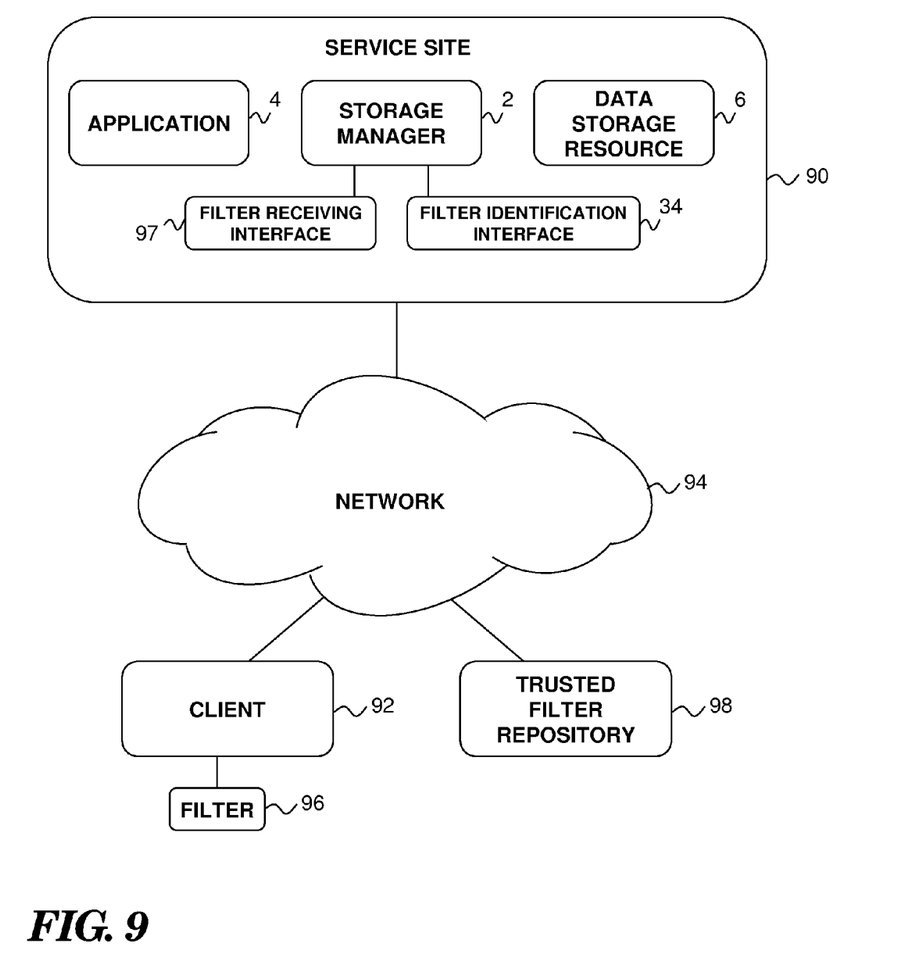
FIG. 9 is a functional block diagram showing an exemplary implementation of the storage manager of FIG. 1 in a remote storage manager service environment.

Turning now to FIG. 9, a further exemplary implementation of the storage manager 2 is shown in which the storage manager operates at a server site 90 in order to provide storage manager services on behalf of a remote client 92 via a network 94. The application 4 and the data storage resource 6 may also be located at the server site 90. Alternatively, those components could be located off premises at other locations. The client 92 could maintain a filter 96 that it provides to the storage manager 2 for use in filtering the client's data (e.g., via a filter receiving interface 97). The storage manager 2 would thus implement a copy of the filter 96 locally at the server site 90. Alternatively, if desired, the client 92 could maintain the sole copy of the filter 96 and simply identify it to the storage manager 2 (e.g., via the filter identification interface 34). In that case, the storage manager 2 could invoke the filter 96 using a remote procedure call and pass data to the filter across the network 94, preferably using a secure connection (e.g., SSL (Secure Socket Layer)). If the server site 90 had a policy that prohibited the use of untrusted third party filters, the client 92 could specify a filter (to the storage manager 2) that resides in a repository 98 maintained by a trusted filter authority.

Accordingly, a technique has been disclosed that allows a storage manager to implement filters for processing data streams. It will be appreciated that the disclosed technique provides a number of advantages not found in conventional storage managers, including the following:
 Users are not limited to the compression, encryption, or other filters provided by a storage manager vendor.
 Users do not have to pay the storage manager vendor an extra fee to enable embedded compression and/or encryption algorithms.
 A user can quickly swap out a filter that is found to have a security flaw or crippling bug and swap in another off-the-shelf component that provides similar functionality, without having to wait for the storage manager vendor to issue a patch release.
 Users can upgrade to the latest filtering technology without waiting for the next release from the storage manager vendor.
 Users do not have to write lengthy programs of their own or re-implement functionality the storage manager would provide if they were not using filters.
 This approach is much safer for customers than a programming hook because they are not required to write a large piece of storage management software on their own, which they might not have processes in place to ensure that the software is adequately tested and debugged before being deployed to production.
 The potential liability of a storage manager vendor that implements the programming hook approach can be avoided.
 Customers are enabled to be more creative because of the generic pluggable nature of filters, and may find this enables them to solve more problems than just compression and/or encryption, such as audit trail generation.

Figure 10:
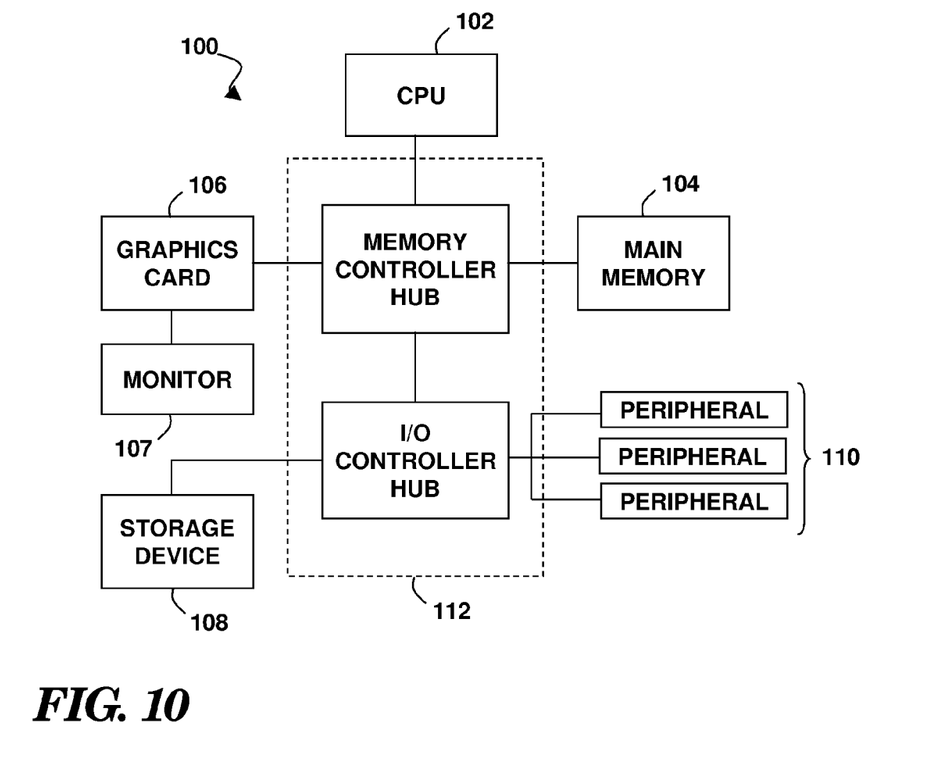
FIG. 10 is a functional block diagram showing exemplary data processing hardware that may be used to provide a system for implementing a software version of the storage manager of FIG. 1.

It will be appreciated that the foregoing concepts may be variously embodied in any of a data processing system, a machine implemented method, and a computer program product in which programming logic is provided by one or more machine-useable media for use in controlling a data processing system to perform the required functions. Relative to a data processing system and machine implemented method, FIG. 10 illustrates an exemplary hardware environment 100 that may be used if the storage manager 2 is implemented as software. The hardware environment 100 includes a CPU or other data processing resource 102 and a main memory 104 that provide a data processing core, a graphics card 106 for generating visual output information to a display monitor 107, a peripheral storage device 108, other peripheral devices 110, and a bus infrastructure 112 interconnecting the foregoing elements. The storage manager 2 may be loaded in the main memory 104. The application 4 (see FIG. 1) could also be loaded in the memory 104 if it runs on the same hardware platform. The storage device 108 may be used as persistent storage for the filter identification store 36. A copy of the filter information could also be maintained in the memory 104. Other data sources may be accessed through I/O (Input/Output) resources provided by the peripheral devices 110, which may include a USB bus controller, a SCSI disk controller, and a network interface card. The monitor 107 may be used to present administrative information.

Figure 11:
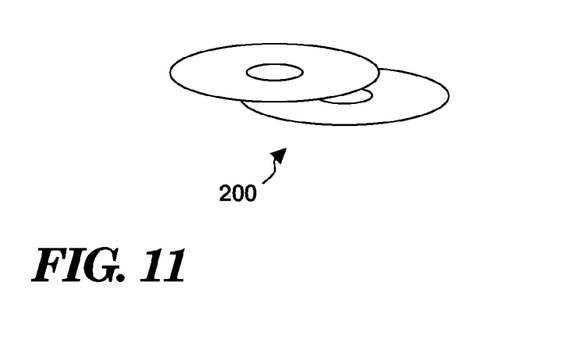
FIG. 11 is a diagrammatic representation of exemplary storage media that may be used in a computer program product implementation of the storage manager of FIG. 1.

Relative to a computer program product having a machine-readable media and programming logic, exemplary data storage media for storing the programming logic are shown by reference numeral 200 in FIG. 11. The media 200 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the invention, either alone or in conjunction with another software product that incorporates the required functionality. The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation medium (such as a network) or signal, or other entity that can contain, store, communicate, propagate or transport the programming logic for use by or in connection with a data processing system, computer or other instruction execution system, apparatus or device.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:
1. A storage manager system configured to manage client data on a data storage resource, comprising:
 a data processing core;
 a first communication interface to an application;
 a second communication interface to a data storage resource;

a filter identification interface configured to receive an identification of a data stream filter that is not part of said storage manager and does not require application or storage manager domain knowledge;

a filter identification store configured to maintain said identification of said filter;

a filter invocation subsystem configured to invoke said filter as part of a requested data stream operation;

a data stream receiver configured to receive a data stream from a data stream source representing one of said application or said data storage resource;

a filter writer configured to provide said data stream to said filter;

a filter reader configured to receive said data stream from said filter following filtering thereof; and a data stream sender configured to send said data stream to a data stream destination representing one of said application or said data storage resource that is not said data stream source.

2. A system in accordance with claim 1, wherein said filter identification comprises one of an attribute of a storage manager transaction request, a storage resource, an application, a host, a user, or a storage object category.

3. A system in accordance with claim 1, wherein said filter is adapted to transform said data stream and is part of a filter pair comprising a write filter that performs a transformation on said data stream and a read filter that may or may not reverse said transformation.

4. A system in accordance with claim 3, wherein said filter comprises one of a compression/decompression filter, an encryption/decryption filter or a character set conversion filter.

5. A system in accordance with claim 1, wherein said filter is adapted to generate information about said data stream without transforming said data stream.

6. A system in accordance with claim 5, wherein said filter is adapted to generate an audit trail.

7. A system in accordance with claim 1, wherein said filter invocation subsystem is adapted to invoke said filter in its own execution context and said data stream writer and reader are adapted to respectively provide and receive said data stream to and from said filter via an interprocess communication mechanism.

8. A system in accordance with claim 7, wherein said interprocess communication mechanism comprises a first pipe for providing said data stream to said filter and a second pipe for receiving said data stream from said filter.

9. A system in accordance with claim 1, wherein said filter invocation subsystem is adapted to invoke said filter with a filter argument that is passed to said filter if said filter is adapted to process said filter argument and suppressed if said filter is not adapted to process said filter argument.

10. A system in accordance with claim 9, wherein said filter is one of an encryption or decryption filter and said filter argument pertains to identification of an encryption key.

11. A storage manager method for managing client data on a data storage resource with data stream filtering on behalf of a remote client, comprising:

implementing a storage manager system, comprising:

a data processing core;

a first communication interface to said remote client;

a second communication interface to a data storage resource;

one of a filter receiving interface or a filter identification interface respectively configured to receive a data stream filter or an identification of a data stream filter that is not part of said storage manager and does not require client application or storage manager domain knowledge;

a filter invocation subsystem configured to invoke said filter;

a data stream receiver configured to receive a data stream from a data stream source;

a filter writer configured to provide said data stream to said filter;

a filter reader configured to receive said data stream from said filter following filtering thereof; and a data stream sender configured to send said data stream to a data stream destination;

implementing a filter store configured to maintain said filter or an identification of said filter and which is accessible by said storage manager system; and receiving said filter or an identification of said filter from said remote client or a location specified by said remote client;

receiving a data stream from a data stream source that is either an application associated with said remote client or said data storage resource;

providing said data stream to said filter; and receiving said data stream from said filter following filtering thereof and sending said data stream to a data stream destination that is either said remote client application or said data storage resource.

12. A method in accordance with claim 11, wherein said filter is received from a trusted authority specified by said remote client.

13. A method in accordance with claim 11, wherein said filter is received from said remote client.

14. A method in accordance with claim 11, wherein said filter is identified by said remote client by selecting one of several filters maintained by said filter store.

* * * * *